(12) United States Patent
Fitzmaurice et al.

(10) Patent No.: US 9,981,354 B2
(45) Date of Patent: May 29, 2018

(54) GUIDE FOR CUTTING PAVING SLABS

(71) Applicants: Andrew Fitzmaurice, Bath (GB); George Hiser, Fareham (GB)

(72) Inventors: Andrew Fitzmaurice, Bath (GB); George Hiser, Fareham (GB)

(*) Notice: Subject to any disclaimer, the term of this patent is extended or adjusted under 35 U.S.C. 154(b) by 65 days.

(21) Appl. No.: 15/100,352

(22) PCT Filed: Nov. 28, 2014

(86) PCT No.: PCT/GB2014/053540
§ 371 (c)(1),
(2) Date: May 31, 2016

(87) PCT Pub. No.: WO2015/079253
PCT Pub. Date: Jun. 4, 2015

(65) Prior Publication Data
US 2016/0297041 A1    Oct. 13, 2016

(30) Foreign Application Priority Data

Nov. 29, 2013 (GB) .................................. 1321072.9

(51) Int. Cl.
*B25B 3/00* (2006.01)
*B23Q 9/00* (2006.01)
*B28D 1/04* (2006.01)

(52) U.S. Cl.
CPC .......... *B23Q 9/0042* (2013.01); *B28D 1/044* (2013.01)

(58) Field of Classification Search
CPC .. B23Q 9/0042; B23Q 9/005; B23Q 17/2233; B28D 1/044; E01B 31/04; B23D 45/021; B23D 45/006; B27B 27/08; B27B 31/06; B27B 9/04

USPC ........ 83/829, 56, 167, 745, 439, 468.4, 574, 83/651, 455, 468.3
See application file for complete search history.

(56) References Cited

U.S. PATENT DOCUMENTS

| 2,942,633 | A | | 6/1960 | King | |
| 4,244,118 | A | * | 1/1981 | Matuszak | B23Q 9/0042 33/430 |
| 4,281,572 | A | | 8/1981 | Stovall | |
| 4,896,647 | A | | 1/1990 | Valva et al. | |
| 5,365,822 | A | | 11/1994 | Stapleton et al. | |
| 5,699,711 | A | * | 12/1997 | Gold | B23D 51/025 83/454 |
| 5,964,041 | A | | 10/1999 | Daniel | |
| 7,011,085 | B1 | | 3/2006 | Lochotzki | |

(Continued)

FOREIGN PATENT DOCUMENTS

| EP | 0101734 B1 | 7/1986 |
| FR | 2560109 A | 8/1985 |

(Continued)

Primary Examiner — David Bryant
Assistant Examiner — Nirvana Deonauth
(74) Attorney, Agent, or Firm — William J. Clemens; Shumaker, Loop & Kendrick, LLP

(57) ABSTRACT

A guide for cutting paving slabs comprises: a guide member (1) for guiding a cutting tool; a clamping means (5, 6); and a locator (3). The clamping means comprises a spindle (5) which passes through an opening in the guide member and connects to the locator. The clamping means is adjustable to adjust the position of the spindle relative to the guide member thereby to adjust the distance between the locator and the guide member.

16 Claims, 3 Drawing Sheets

(56) References Cited

U.S. PATENT DOCUMENTS

2005/0061128 A1* 3/2005 Caughlin ............. B23Q 9/0042
 83/574
2013/0247738 A1* 9/2013 Stoffel ................. B23Q 9/0042
 83/821

FOREIGN PATENT DOCUMENTS

GB 2218375 A 11/1989
GB 2264894 A 9/1993

* cited by examiner

GUIDE FOR CUTTING PAVING SLABS

FIELD OF THE INVENTION

The present invention relates to a guide for cutting paving slabs

BACKGROUND TO THE INVENTION

When lying paving in construction or hard landscaping it is often necessary to use slabs that are not whole and are of different shapes and sizes but where the cut edges must remain straight. This is usually achieved using a powered cutting disk blade, hand held and free cut. There is therefore a significant risk to this process both in personal injury and in achieving a straight and accurate cut. Additionally, each slab must be measured and marked so that the operator is able to follow the marking making the accuracy more difficult and time consuming.

SUMMARY OF THE INVENTION

By 'slab', 'paving' or 'paving slab' we mean any flat concrete slab, natural stone, composite stone or tile used in construction or hard landscaping, outside or inside and generally of a thickness greater than 20 mm.

According to the invention there is provided a guide for cutting paving slabs comprising: a guide member for guiding a cutting tool; a clamping means; and a locator. The clamping means may comprise a spindle which passes through an opening in the guide member and connects to the locator, and the clamping means may be adjustable to adjust the position of the spindle relative to the guide member thereby to adjust the distance between the locator and the guide member.

Preferably the locator is biased away from the guide member by a spring.

Preferably the spring is fitted onto the spindle between the locator and the guide member.

Preferably the locator is rotatably connected to the spindle.

Preferably the opening in the guide member is a slot through which the spindle extends and along which the clamping means can slide.

Preferably the locator is arranged to engage with the bottom surface of a paving slab, and the guide member is arranged to engage with the top surface of a paving slab.

Preferably the locator is arranged to engage with a side surface and a bottom surface of a paving slab.

Preferably the locator is arranged to locate the guide member relative to an edge of a paving slab, the edge being defined between a side surface and a bottom surface of the paving slab, and wherein the locator is arranged to allow the guide member to be positioned at any point along the edge of a paving slab.

Preferably the locator defines two points or surfaces positioned at substantially 90 degrees so that the edge of a paving slab can be positioned between the two points or surfaces.

Preferably the locator is formed from a piece of material and defines at least one corner by bending a portion of the material through substantially 90 degrees.

Preferably the spindle is threaded and a threaded member engages with the threaded portion and is positioned on the opposite side of the guide member to the locator, wherein turning the threaded member adjusts the position of the locator relative to the guide member.

Preferably the threaded member is a handle which allows manual turning.

Preferably the guide further comprises a second clamping means with a second locator, the guide member further comprising a second opening, the first opening being located proximate to a first end of the guide member and the second opening being located proximate to a second end of the guide member, the first clamping means being located in the first opening and the second clamping means being located in the second opening.

Preferably the guide member comprises a flat base for engaging the slab and a flat guide surface positioned perpendicular to the base.

Preferably the guide member is a straight length of material comprising an L section that defines the guide surface and the base.

Preferably the guide member is a straight length of channel section, the bottom of the channel forming the base, and the sides of the channel providing two guide surfaces.

According to the invention there is provided a guide for cutting a slab, the guide comprising a cutting guide and alignment means arranged such that the guide can be laid on the slab with the underside of the guide in contact with the top surface of the slab, the guide further comprises of sprung locking mechanisms that clamp the guide on the top and bottom faces of the slab at two opposite positions allowing the means by which a cut may be made in the slab along a line defined by the cutting face of the guide.

BRIEF DESCRIPTION OF THE DRAWINGS

The present invention may be carried into practice in various ways, but embodiments will now be described by way of example only with reference to the accompanying drawings in which.

DETAILED DESCRIPTION OF THE PREFERRED EMBODIMENTS OF THE INVENTION

Figure 1:
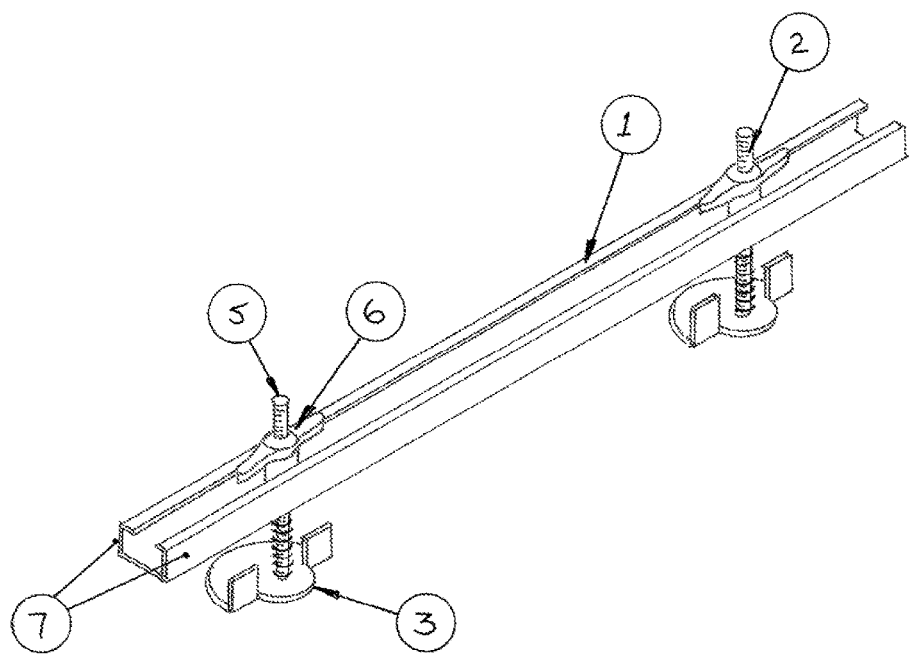
FIG. 1 is a perspective view of a guide for cutting a paving slab in accordance with an embodiment of the present invention.
Figure 2:
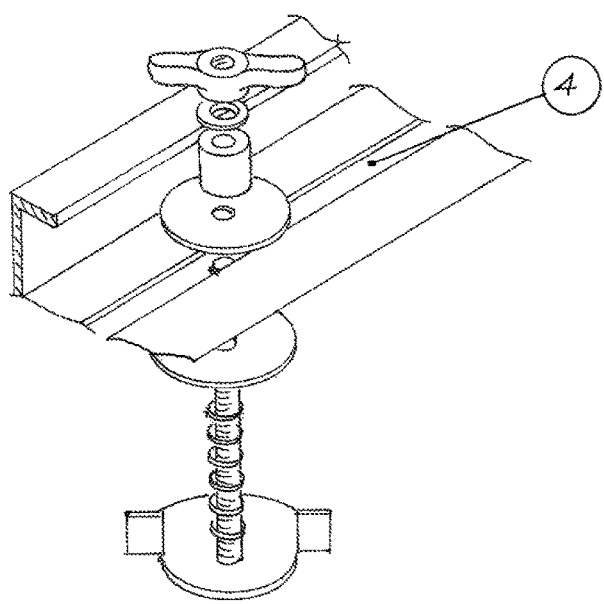
FIG. 2 is an exploded view of the clamping means of the guide from FIG. 1.
Figure 3:
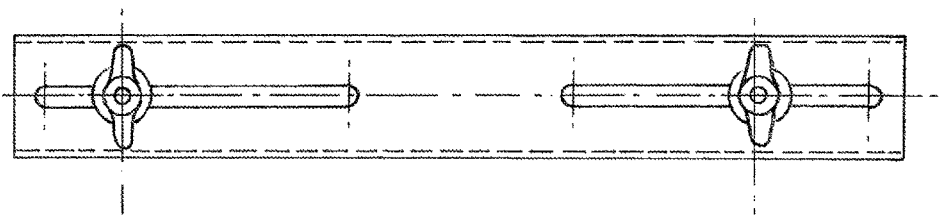
FIG. 3 is a top view of the guide shown in FIG. 1.
Figure 4:
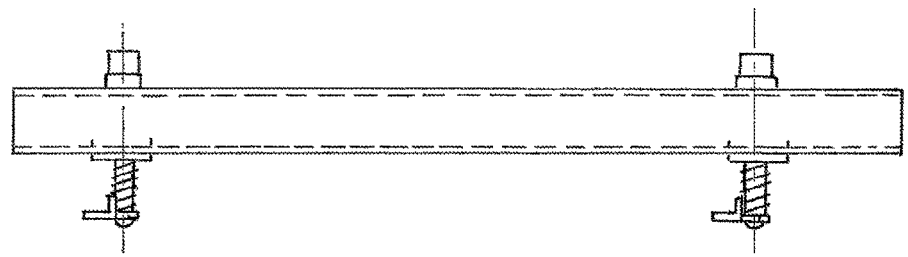
FIG. 4 is a side view of the guide shown in FIG. 1.
Figure 5:
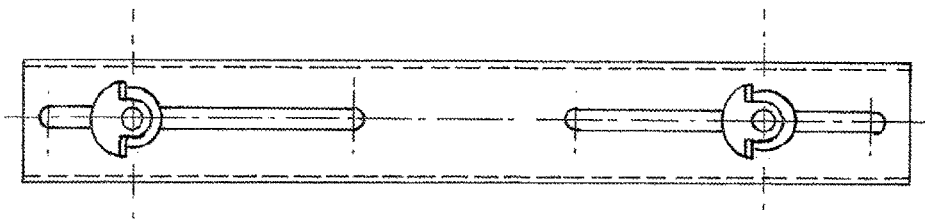
FIG. 5 is a bottom view of the guide shown in FIG. 1.
Figure 6:
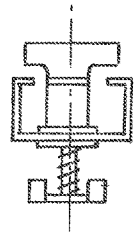
FIG. 6 is an end view of the guide shown in FIG. 1.
Figure 7:
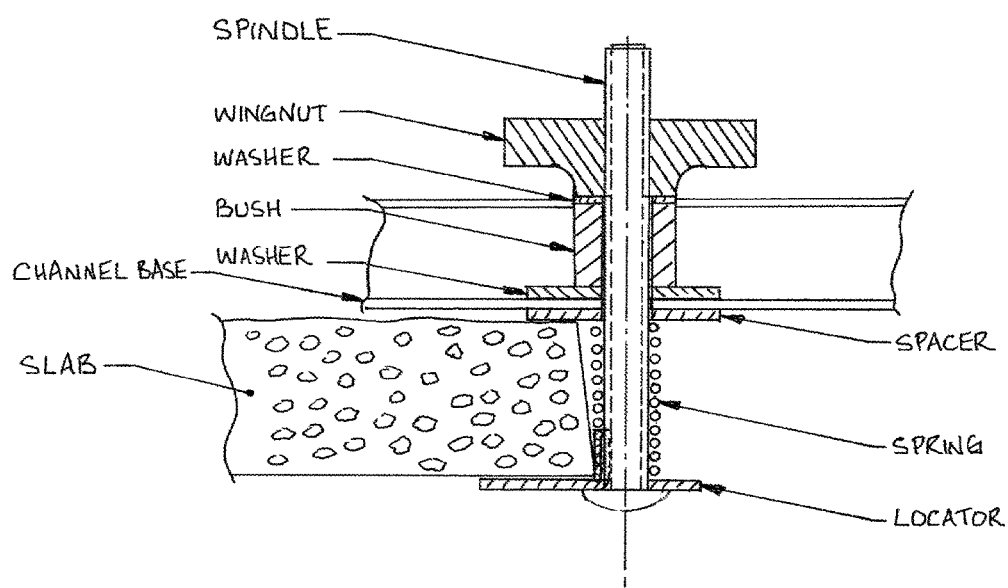
FIG. 7 is a section view of the guide shown in FIG. 1 fitted to a paving slab.

Referring initially to FIG. 1, a cutting guide comprises an oblong planar channel base 1.

Alignment means comprises two elongated planar sides 7 either side of a channel, square in cross section so as to form a peripheral wall.

The guide is mounted to the slab by means of two adjustable sprung locking mechanisms 2 mounted so that they might adjust on two planes vertically and horizontally.

The movement of the locking mechanisms along the guide in the horizontal plane is formed with a through slots 4 extended along the longitudinal axis thereof. In use the locking mechanisms are secured to the guide and the slab using a bolt 5 and handled wing nut 6 on each mechanism through the slots, the bolt and handled wing nuts releasably clamping the guide to the slab. The position of the locking mechanism can be adjusted longitudinally by sliding along the slot and adjusted vertically to form the locking action on the slab.

Through the action of the locking mechanism relative to the guide, the positioning of the cutting surface of the guide across the surface of the slab can be set in any aspect square or angled relative to a datum side of the slab through the relative positioning and clamping of each of the locking mechanisms to each other.

It is envisaged that the guide alignment means and guide means of each guide 1 would be made from a metal material such as stainless steel although any other suitable material could alternately be used.

It is also envisaged that the alignment means and guide means could be locked on and secured to the slab using any suitable means which could include quick release clamps or snap fit connections instead of, or in addition to the bolt and handled wing nuts.

The slab cutting guide may be provided with a replaceable guide if damaged by the cutting process.

The cutting guide comprises a channel base where the bottom underside planer surface sits parallel to the surface of a slab to be cut. The vertical planer sides of the channel, that are perpendicular to the bottom planer surface, are surfaces along which the side face of a blade from a separate powered hand held saw can track between two points in a straight line to form a straight cut using the cutting edge of the blade.

The channel base has two slots which pass through the bottom of the channel and are one at either end of the cutting guide, but do not meet in the middle.

Through these two slots, each has a threaded spindle that is allowed to slide the length of the slot.

At the bottom of each spindle is a locator. A spring sits over the threaded spindle between the locator and the underside of the cutting guide. A spacer sits over the spindle between the spring and the cutting guide. The adjustment of the distance between the locator and the spacer is by way of a threaded wing-nut which sits on the spindle above the cutting guide. The height of the handle is set by a bush and washer that sit on the spindle between the wing-nut and the cutting guide.

The cutting guide sits on the slab and is in contact with the slab at two points via the spacers.

The locator sits against the underside of the slab to offer an opposite force to the spacer and cutting guide on the top of the slab so that the cutting guide sits fast against the slab.

The locator is prevented from turning by tabs on the locator that sit against the side face of the slab to offer resistance to the turning forces when adjusting the wing-nut.

The cutting guide sits on the slab and is positioned to align with marks or a line scribed on the slab in the position of the intended cut. The line of cut can be defined across the slab between opposite sides and positioned at any opposing two points to form a square or angular cut. The line of cut can also be defined across adjacent sides to form an angled cut that separates one corner from the slab.

The locator is shaped such that at no point does the locator protrude beyond the line of cut defined by the vertical planer sides of the channel base.

The invention claimed is:

1. A guide for cutting paving slabs, the guide comprising:
   a guide member for guiding a cutting tool, the guide member having an underside and having at least one opening therethrough; and
   a first clamp, and a second clamp;
   wherein each of the first and second clamps comprises a spindle, a locator, and a spring, the spindle passing through the at least one opening in the guide member and connecting to the locator, and the spring being arranged to bias the locator away from the underside of the guide member, and
   each of the first and second clamps is adjustable to adjust a position of the respective spindle relative to the guide member thereby to adjust a distance between the respective locator and the underside of the guide member, thereby to clamp a paving slab between the underside of the guide member and the locator, and
   the at least one opening in the guide member comprises a slot through which the spindle of the first clamp extends, and along which the first clamp can slide thereby to adjust the position of the first clamp along the guide member.

2. The guide according to claim 1 wherein the spring is fitted onto the spindle between the locator and the guide member.

3. The guide according to claim 1 wherein the locator is rotatably connected to the spindle.

4. The guide according to claim 1 wherein the locator is arranged to engage with a bottom surface of a paving slab, and the guide member is arranged to be positioned across a top surface of the paving slab.

5. The guide according to claim 4 wherein the guide member is positioned above the top surface of the paving slab using a spacer.

6. The guide according to claim 1 wherein the locator is arranged to engage with a side surface and a bottom surface of a paving slab.

7. The guide according to claim 1 wherein the locator is arranged to locate the guide member relative to an edge of a paving slab, the edge being defined between a side surface and a bottom surface of the paving slab, and wherein the locator is arranged to allow the guide member to be positioned at any point along the edge of the paving slab.

8. The guide according to claim 1 wherein the locator defines two points or surfaces positioned at substantially 90 degrees so that an edge of a paving slab can be positioned between the two points or surfaces.

9. The guide according to claim 1 wherein the locator is formed from a piece of material and defines at least one corner by bending a portion of the material through substantially 90 degrees.

10. The guide according to claim 1 wherein a portion of the spindle is threaded and a threaded member engages with the threaded portion and is positioned on an opposite side of the guide member to the locator, wherein turning the threaded member adjusts the position of the locator relative to the guide member.

11. The guide according to claim 10 wherein the threaded member is a handle which allows manual turning.

12. The guide according to claim 1 wherein the at least one opening is a first opening, the guide member further comprising having a second opening therethrough, the first opening being located proximate to a first end of the guide member and the second opening being located proximate to a second end of the guide member, the first clamp being located in the first opening and the second clamp being located in the second opening.

13. The guide according to claim 12 wherein the locators are arranged to be positioned on opposite sides of a paving slab and each can be positioned independently at any point along their respective side.

14. The guide according to claim 1 wherein the guide member comprises a flat base for engaging a paving slab and a flat guide surface positioned perpendicular to the base.

15. The guide according to claim 14 wherein the guide member is a straight length of material comprising an L section that defines the guide surface and the base.

16. The guide according to claim 14 wherein the guide member is a straight length of channel section, a bottom of the channel forming the base, and sides of the channel providing two of the guide surface.

\* \* \* \* \*